March 1, 1966 R. D. RUMSEY 3,237,728
ROTARY HYDRAULIC SHOCK ABSORBER
Filed July 23, 1964 5 Sheets-Sheet 3
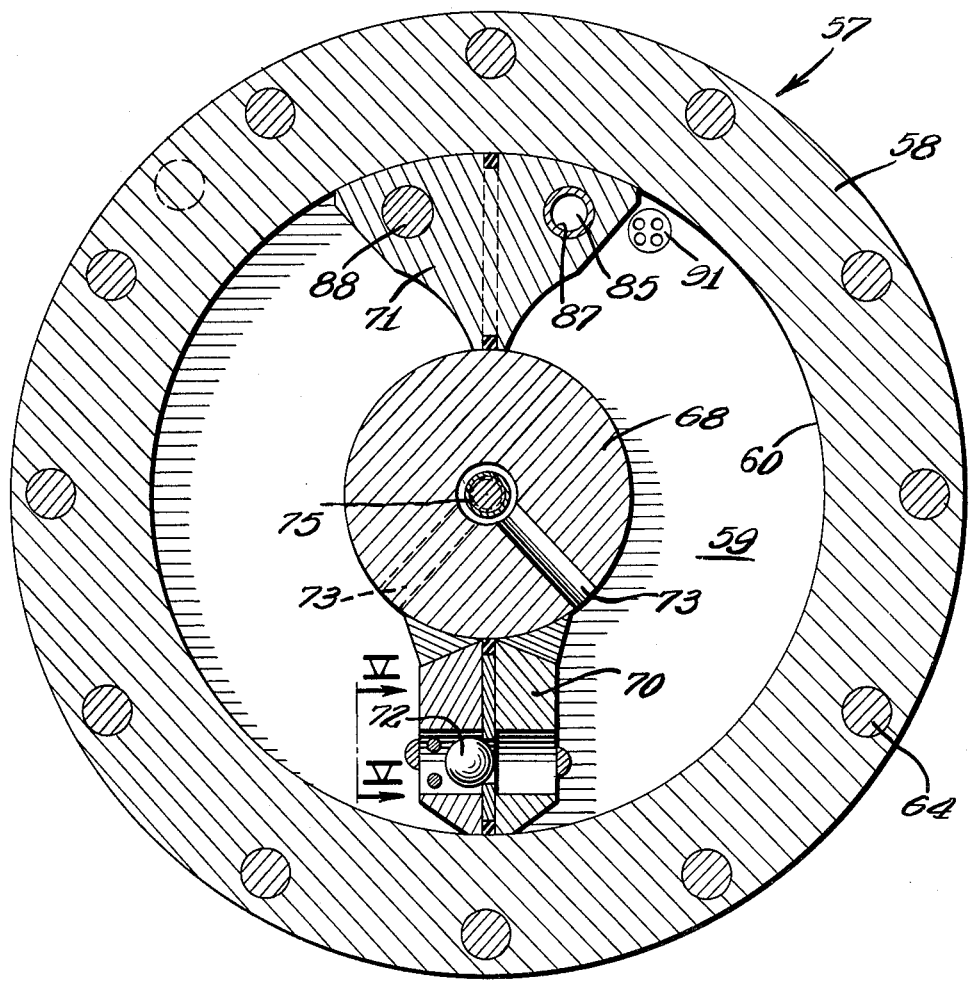
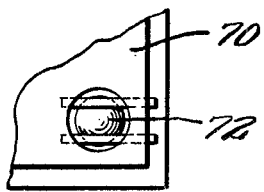
INVENTOR.
Rollin Douglas Rumsey
ATTORNEYS

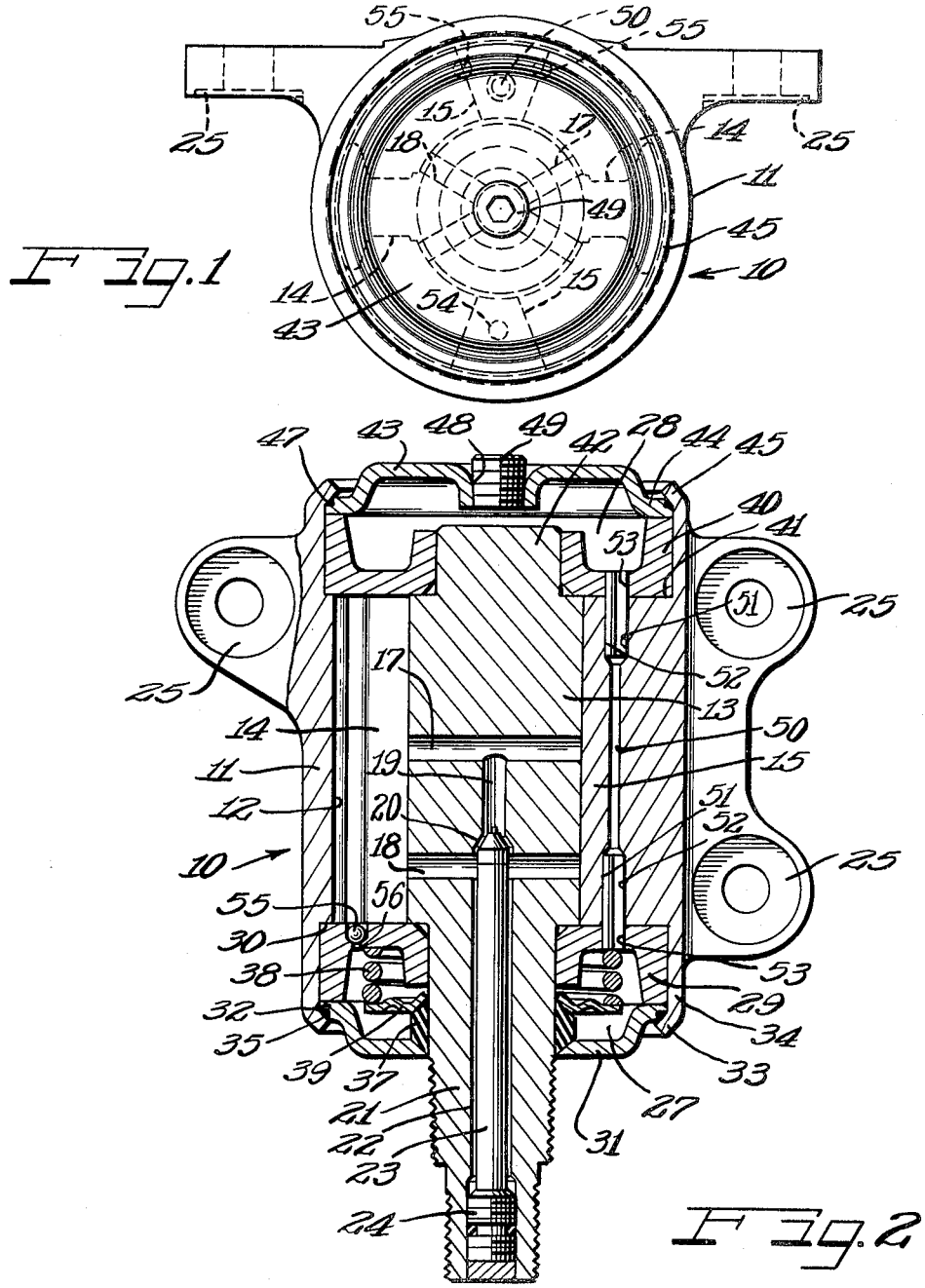

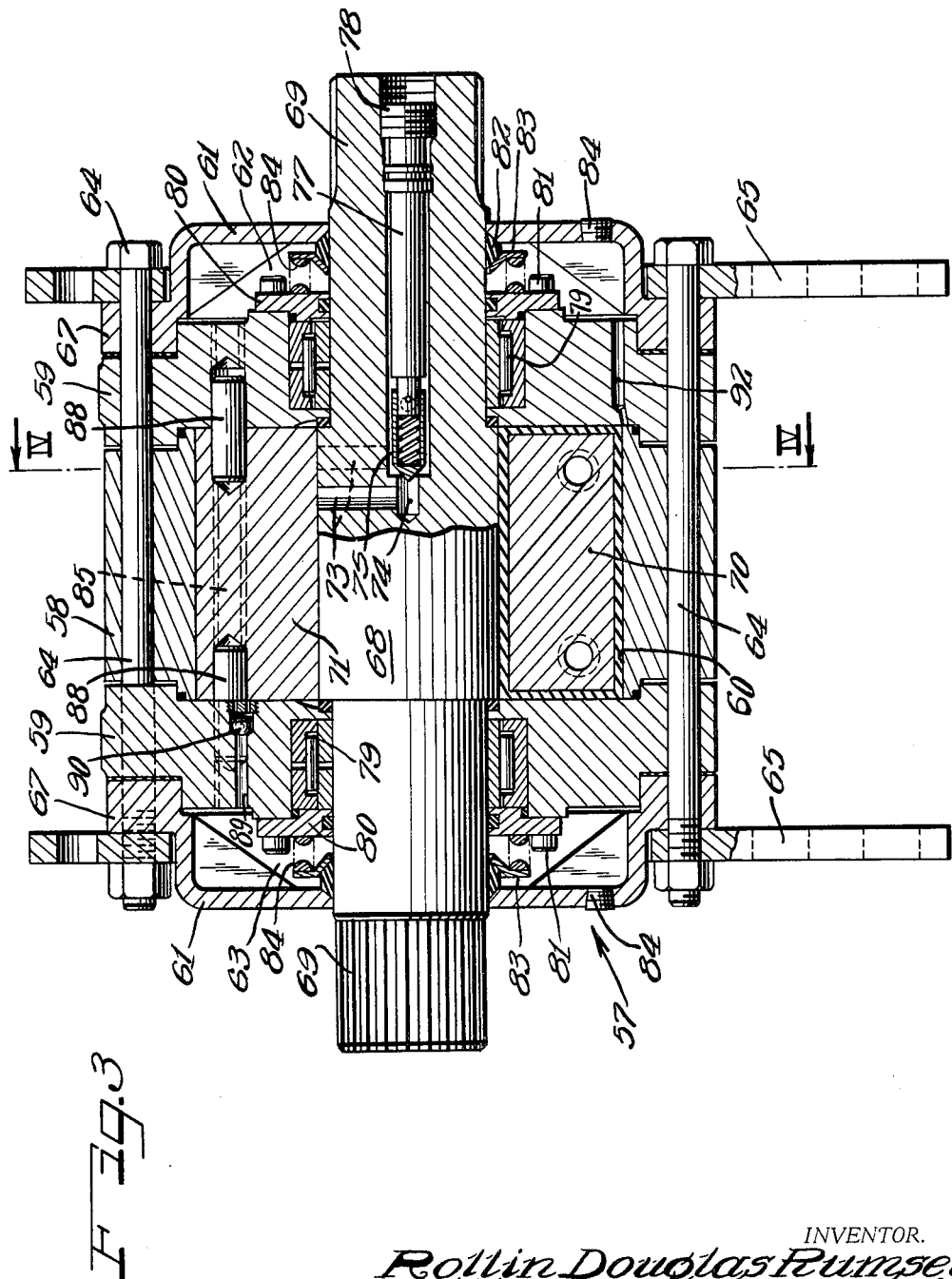

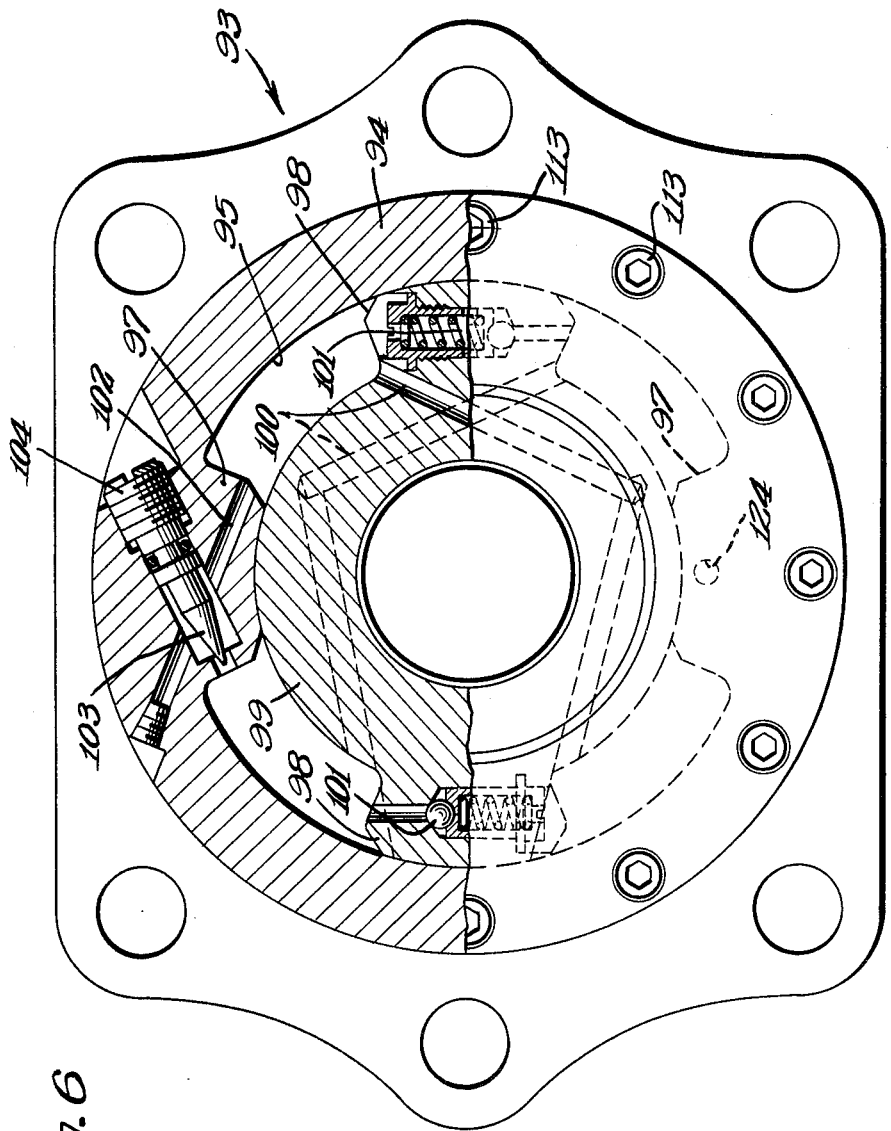

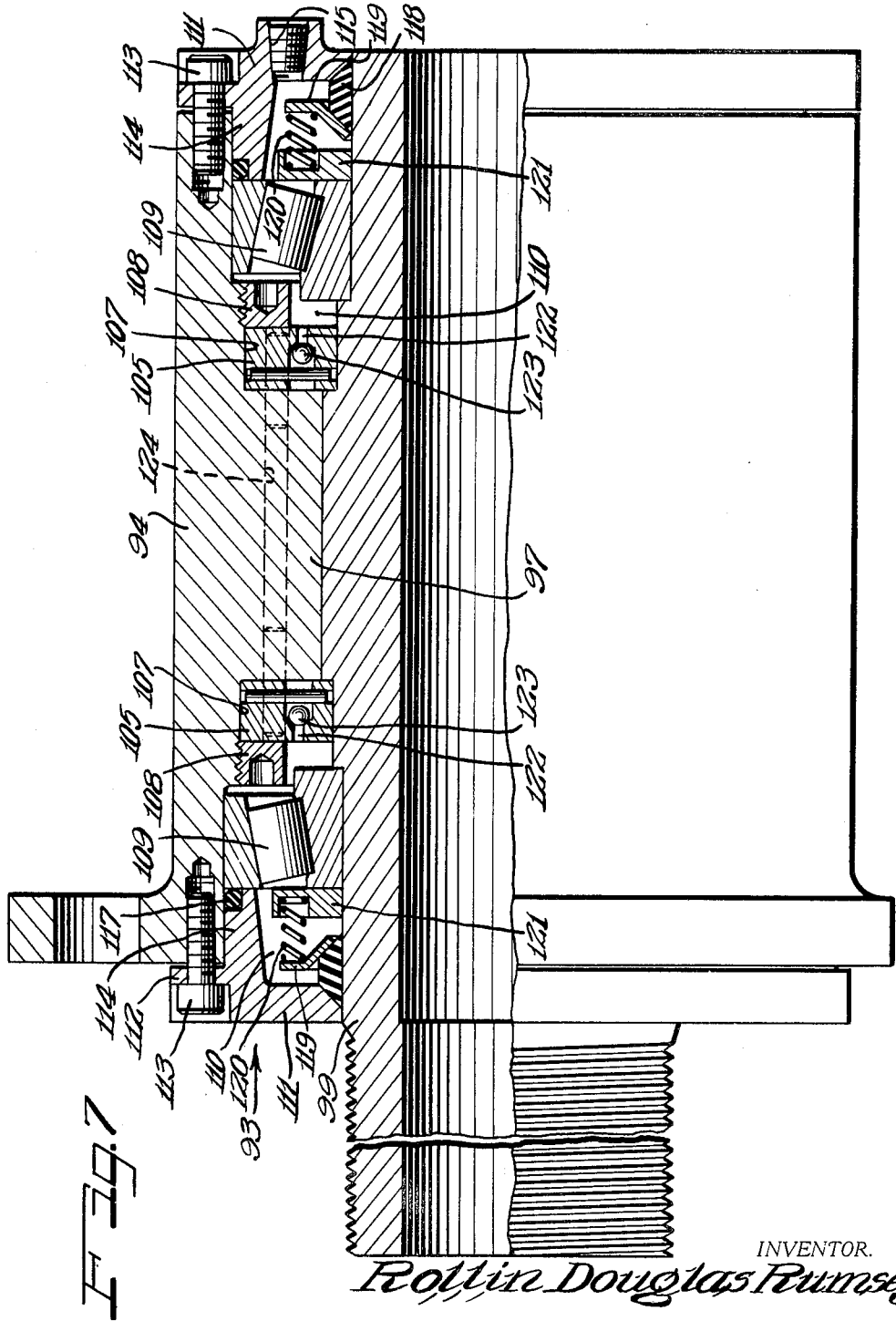

United States Patent Office 3,237,728
Patented Mar. 1, 1966

3,237,728
ROTARY HYDRAULIC SHOCK ABSORBER
Rollin Douglas Rumsey, Buffalo, N.Y., assignor to Houdaille Industries, Inc., Buffalo, N.Y., a corporation of Michigan
Filed July 23, 1964, Ser. No. 384,739
11 Claims. (Cl. 188—93)

This invention relates to improvements in rotary hydraulic shock absorbers and more particularly to shock absorbers of this type having one or more vanes on a wing shaft operable in relatively rotary relation in a housing having one or more abutments dividing a working chamber into compartments between which hydraulic fluid is displaced under valve controlled pressure.

Prior rotary hydraulic shock absorbers of this type have been of relatively high cost and there have been limitations upon the attitude in which they may be mounted in operation, namely only with the shaft extending upwardly or horizontally. Furthermore, the prior shock absorbers have embodied features of hydraulic unbalance which causes wear in use.

It is an important object of the present invention to overcome the foregoing and other shortcomings and to provide an improved rotary hydraulic shock absorber capable of universal mounting, longer life and lower cost.

Another object of the invention is to provide a new and improved rotary hydraulic shock absorber which will attain the foregoing object in various practical embodiments as to functional capability, size, and the like.

A further object of the invention is to provide in rotary hydraulic shock absorbers a novel replenishing reservoir arrangement.

Still another object of the invention is to provide a new and improved rotary hydraulic shock absorber construction protected against overload and eliminating the need for pressure relief valves.

Yet another object of the invention is to provide a new and improved rotary hydraulic shock absorber construction affording substantial improvements in displacement relative to bearing clearance, leakage paths, and in which lower forces are exerted on the end covers.

Other objects, features and advantages of the present invention will be readily apparent from the following detailed description of certain preferred embodiments thereof, taken in conjunction with the accompanying drawings, in which:

FIGURE 1 is an end elevational view of one practical embodiment of the invention;

FIGURE 2 is a composite longitudinal sectional detail view through the embodiment of FIGURE 1;

FIGURE 3 is a longitudinal composite sectional detail view through a modified embodiment;

FIGURE 4 is an enlarged transverse sectional detail view taken substantially on the line IV—IV of FIGURE 3;

FIGURE 5 is an elevational detail view substantially in the plane of line V—V of FIGURE 4;

FIGURE 6 is an end elevational view partially broken away and in section of a further modified form of the invention; and FIGURE 7 is a side elevational view partially in longitudinal section of the modification of FIGURE 6.

In FIGURES 1 and 2 a rotary hydraulic shock absorber unit 10 is depicted adapted for moderate loads and low cost production. This unit has been found to have especial practical utility as a shimmy damper in a relatively small size unit. An elongated tubular housing 11 provides an essentially cylindrical longitudinal working chamber 12 within which is concentrically mounted a wing shaft 13, the body of which is of smaller diameter than the working chamber 12. Diametrically opposite vanes 14 on the wing shaft 13 have their free edges complementally conformed to the opposing wall defining the working chamber 12 and cooperate with diametrically opposite abutments 15 of the housing 11 to subdivide the chamber 12 into working compartments which are in service operation filled with suitable hydraulic fluid such as oil, silicone and the like.

In a substantially conventional known manner, the working compartments are cross connected by respective axially spaced cross bores 17 and 18 through the wing shaft 13. These cross bores are connected by an axial bore 19 defined by a generally conical control throat 20 at its end nearest an attachment stem 21 of the wing shaft projecting outwardly beyond one end of the housing 11. Mounted axially in a suitable bore 22 in the stem 21 and aligned with the connecting bore 19 is an elongated needle valve member 23 having a threaded adjustment head 24 which is readily accessible from the outer end of the shaft 21. The tip of this needle valve cooperates with the throat 20 to provide a damping throttle on the passage of hydraulic fluid between the crossingly connected working compartments of the working chamber 12.

According to the present invention, means are provided for maintaining a balanced filled hydraulic loading of the working compartments in the chamber 12 in any universal mounting of the shock absorber unit 10 through the medium of mounting ears 25 integral with the housing 11. To this end, hydraulic fluid replenishment means are provided comprising at least one reservoir, herein a reservoir 27 at the wing shaft stem end of the unit and a reservoir 28 at the opposite end of the unit. These reservoirs are interconnected and communicate with the working compartments.

In providing the reservoir 27, a ring shaped end flange member 29 is seated in a groove 30 in the adjacent end of the housing 11 and retainingly opposes the adjacent end of the wing shaft body, the vanes 14 and the abutments 15, with the wing shaft stem 21 extending slidably journalled outwardly through the flange member. Seated on the radially outer margin of the flange member 29 is a generally cup-shaped end cap or cover member 31 having an annular radial flange 32 which is clamped retainingly against the flange member by a rolled over terminal portion 33 of an axially extending integral end flange 34 of the housing member. Sealing material 35 in an annular groove of the flange 32 effects a fluid-tight seal between the cover member and the turned over flange 33. A seal between the cover member 31 and the wing shaft stem 21 is afforded by a packing ring 37 spring loaded by a compression spring 38 and a thrust washer 39.

On the opposite end of the damper unit 10, the reservoir chamber 28 is defined by a closure flange ring 40 similar to the flange 29 and seated in a groove 41 in the adjacent end of the body 11. At its inner margin, the flange 40 retainingly opposes the adjacent end of the body of the wing shaft 13 and affords a bearing for a reduced diameter inner terminal or end portion 42 of the wing shaft body which is preferably of the same diameter as the wing shaft stem 21 journalled through the end flange member 29 which provides a bearing therefor. Providing an outer end closure for the reservoir 28 is a generally cup-shaped end cap closure member 43 having an outer annular radial marginal flange 44 clampingly retainingly engaged by a turned over annular terminal flange 45 on the adjacent end of the damper housing, with an annular seal 47 in an appropriate groove in the flange 44 preventing fluid leakage from within the unit. For filling the damper unit with hydraulic fluid, the cover member 43 is provided with a filler opening 48 closed by a threaded plug 49.

Free hydraulic fluid transfer communication between the reservoirs 27 and 28 is afforded by suitable connecting passage means, conveniently comprising a longitudinal duct bore 50 extending through at least one of the abutments 15. At its opposite ends the passage bore 50 is provided with or communicates with respective counterbores 51 into which are driven tubular dowels or roll pins 52 having their outer end portions engaged in respective matching bores 53 in the end flanges 29 and 40 to hold these members, together with dowels 54 connecting them to the remaining abutment, corotative with the body 11. Through this arrangement, free communication between the reservoirs 27 and 28 is afforded by-passing the working chamber 12.

Replenishment of the working compartments within the chamber 12 is effected through a respective port 56 for each of the cross connected pair of working compartments opening through one of the end flanges, herein the end flange 29 in generally bisected overlapping relation to one of the abutments and check valved as by means of a ball 55 for replenishing in-flow from the reservoir 27 into the working compartments and against outflow through the replenishing ports of hydraulic fluid from the compartments.

External leakage from the shock absorber units 10 is virtually precluded by the assembly joint seals 35 and 47, the shaft packing 37 and suitable sealing means associated with the valve head 24. In this embodiment, therefore, sealing means between the various components defining the working compartments is unnecessary, any internal leakage in operation being into the reservoirs 27 and 28 which afford replenishment supply for the working chambers. This also affords a highly advantageous overload safety feature since by virtue of the long body length relative to diameter of the working chamber excessive pressures are relieved by resilient oval-like distortions of the body 11 to by-pass the excessive pressure around the vanes 14. Higher displacement in relation to bearing clearance, leakage paths affording lubrication of rubbing parts, and lower forces on the end covers 31 and 43 are further advantages. In addition, the working chamber 12 at all times remains purged of air which readily bleeds off into the highest of the reservoir chambers. In certain instances, suitable air bleed scratch or minute orifice may be provided from the end of the working chamber 12 to the uppermost of the reservoirs, if desired.

In a more elaborate, heavy duty damper unit 57 (FIGS. 3, 4 and 5) a housing is provided comprising a tubular ring-shaped body member 58 with the opposite ends of which are assembled substantially similar end flange members 59 to define a working chamber 60. Assembled on the outer ends of the end flange members 59 are generally cup-shaped end cover members 61 defining respective replenishing reservoirs 62 and 63. The stacked elements are secured together in the housing assembly by bolts 64, with apertured attachment plates 65 attached by the bolts to the outer ends of radial annular attachment flanges 67 on the cover members 61. Suitable sealing means to prevent leakage from the joints between the stacked housing members, comprise sealing gasket and sealing ring members.

Axially relatively rotatably supported by the housing assembly of the damper unit 57 is a wing shaft 68 of symmetrical construction including opposite outer end portions 69 which are suitably splined for effecting connection with apparatus on which the damper is used.

Within the working chamber 60, a vane 70 on the wing shaft coacts with the bore wall defining the chamber and an abutment 71 for hydraulic damping energy absorption. In this instance the vane 70 carries a pair of check valves 72 passing hydraulic damping fluid in the chamber 50 under a low order of restriction through the vane in one direction, that is toward the left as viewed in FIGURE 4, while blocking the flow through the vane in the opposite direction. Damping displacement of hydraulic fluid during clockwise movement of the vane 70 in the working chamber as viewed in FIGURE 4 is through radial passage bores 73 in the wing shaft 68 connected by an axial blind end bore 74 controlled by a spring biased needle valve 75 on a valve stem 77 having an adjustment head 78 accessible through one of the end portions 69 of the wing shaft for effecting damping, throttling adjustments of the valve.

Bearing means comprising roller bearings 79 for the wing shaft are mounted in the aligned central bores of the end flange members 59. Removable retainers for the bearing assemblies are provided by respective flange rings 80 secured as by means of screws 81.

Leakage past the wing shaft through the covers 61 is prevented by respective packing rings 82 under compression of thrust plates 83 biased by springs 84.

Filling of the damper 57 with hydraulic fluid is adapted to be effected through respective filler ports 84 in the end caps 61, suitably plugged after filling.

Free communication between the reservoirs 62 and 63 is enabled through a passage 85 provided by a hollow tubular dowel 87 extending through both of the end flanges 59 and the abutment 71 and opening at its opposite ends into the respective reservoirs. Additional conventional dowels 88 are provided to complete the securement of the abutment 71 to the end flanges 59. At least one of the end flanges 59 has therethrough a replenishing passage 89 having an enlargement or counterbore adjacent the working chamber 60 within which a check ball valve 90 is retained by a grid member 91 and permits replenishing flow into the chamber 60 but checks escape of hydraulic fluid from the working chamber. To purge the working chamber 60 of air, a restricted air bleed passage 92 may be provided through one of the end flanges 59 to communicate with the high point of the damper unit.

By virtue of the construction and relationship of components as described for the damper unit 57, it is equipped for efficient high pressure compression stroke damping with less rebound stroke damping. It will be appreciated that in FIGURES 3 and 4 the several valves are disclosed as they appear during compression stroke operation of the damper.

In FIGURES 6 and 7 a damper unit 93 of the double vane type is disclosed especially adapted for heavy duty uses and embodying the present invention. This unit includes an elongated one-piece hollow tubular body member 94 having therein a working chamber bore 95 and provided with diametrically opposed integral abutments 97 with which vanes 98 of a tubular wing shaft 99 cooperate in the working chamber 95 to divide the same into subchambers or working compartments respectively cross-connected by cross passages 100. In this instance the damper is of the high pressure compression stroke and low pressure rebound stroke type, with one or more one-way displacement passages having spring loaded valve assemblies 101 through the wing shaft vanes 98 checking hydraulic fluid against passing through the vanes during compression stroke, counterclockwise in FIGURE 6, and serve as relief valves adapted to blow off during extremely rapid response shock loadings in low pressure damping during rebound or return stroke, which is clockwise in FIGURE 6. For both compression and rebound oscillatory strokes of the wing shaft 99, adjusted damping displacement of hydraulic fluid is effected through a passage 102 through one of the abutments 97 controlled by a needle valve 103 having an adjustment head 104 accessible from the outside of the housing 94.

Closing the opposite ends of the working chamber 95 are respective end flanges 105 of ring shape mounted in respective outwardly opening counterbores 107 in the body 94 and secured in place against the adjacent ends of the abutments 97 by retaining ring nuts 108. Anti-friction rotary mounting of the wing shaft 99 is effected by means of anti-friction bearings comprising roller bearing assemblies 109 mounted in freely lubricated relation within reservoir spaces 110 defined about the adjacent end portions of the wing shaft 99 within the axial flange portion of the housing 94 afforded by the counterbores 107, with the end flanges 105 at the inner ends of the reservoirs and closure caps or covers 111 closing the outer ends of the reservoirs.

Each of the end covers 111 comprises a generally cup-shaped flange member having an outer marginal radial annular flange portion 112 secured as by means of screws 113 to the adjacent end of the body 94. As a bearing race retainer, each of the cover members 111 has an inwardly axially extending flange 114 telescoped in the adjacent end flange portion of the body 94. At least one of the cover members 111 has a filler aperture 115 closed by a conventional pipe type plug.

Sealing against external leakage is effected by a sealing O-ring 117 mounted in the inner end portion of the telescoped cover flange 114 and engaging the adjacent wall portion of the housing 94. Further, respective shaft sealing packing rings 118 are placed under sealing pressure about the end portions of the wing shaft 99 by compression between the cover members 111 and respective thrust flange disk members 119 under the pressure of compression springs 120 thrusting at their opposite ends against respective sealing rings 121.

In this instance replenishing flow of hydraulic fluid from the reservoirs 110 into the working chamber 95 is effected through both of the end flanges 105 through respective passages 122 controlled by respective check valves 123 which prevent escape of hydraulic fluid from the working chamber through the passages 122 under compression. Intercommunication between the reservoirs 110 is through a longitudinal passage 124 through one of the abutments 97.

In all embodiments of the invention, it will be observed that the vane length is equal to at least one half the working chamber bore diameter thereby affording the capability of the relatively long body to distort resiliently under pressure for safety pressure relief. There is a higher displacement in relation to bearing clearance than in prior dampers. Improved leakage paths internally of the units are afforded and the end covers are under quite low forces greatly minimizing external leakage problems. This also permits looser tolerances or fit between moving parts than has heretofore been considered practicable.

It will be understood that modifications and variations may be effected without departing from the scope of the novel concepts of the present invention.

I claim as my invention:

1. A rotary hydraulic shock absorber comprising a tubular body defining a cylindrical working chamber having at least one abutment therein and a wing shaft relatively rotatably disposed coaxially through said chamber and having at least one vane cooperating with the wall defining said chamber and said abutment to subdivide the chamber into working compartments, displacement passage means connecting the compartments and having flow restricting valve means therein, respective end flanges supported on said body and closing the opposite ends of said chamber, respective cover members cooperating with said end flanges to refine respective reservoir chambers, means fixedly securing said end flanges and said cover members in place on said body, at least one end portion of the wing shaft projecting as an attachment stem in journalled relation through one of said end flanges and its cooperating cover member, means affording a shaft seal between said wing shaft portion and the cover member through which it projects, passage means completely bypassing said chamber and freely connecting said reservoirs, and check valved replenishing communication passage means between at least one of said reservoirs and said chamber.

2. A damper as defined in claim 1, in which said passage means connecting the reservoirs comprises a bore through said abutment and said end flanges.

3. A damper as defined in claim 1, wherein bearing means are mounted on said body between said end flanges and said cover members within the reservoirs for journalling the wing shaft.

4. A damper as defined in claim 1, wherein said means for securing the cover members and the end flanges comprise turned over longitudinal annular flange portions on the body.

5. A damper as defined in claim 1, wherein said body and end flanges and cover members are assembled in stacked relation and are bolted together by bolts extending through all of them.

6. In a rotary hydraulic shock absorber, an elongated body having means thereon for attachment to apparatus with which the shock absorber is to be used and defining a cylindrical working chamber opening from opposite ends of the body and having therein a pair of diametrically opposite abutments integral with the body, a wing shaft coaxially extending through the working chamber and having a pair of diametrically opposite vanes cooperating with the wall defining said working chamber and said abutments to subdivide the working chamber into a plurality of working compartments, cross bores in the wing shaft connecting respective diametric pairs of the compartments, a valve controlled bore in the wing shaft connecting said cross bores, generally axially oppositely extending integral flanges on the opposite ends of the body and defining seating grooves, respective end flange members seated in said grooves and closing the opposite ends of said working chamber, respective generally cup-shaped closure members seated on said end flange members, said body flanges being turned over into retaining relation to said cover members, said wing shaft having an end portion providing an attachment stem projecting through one of said end flange members and the companion cover member, means providing a shaft seal between the projecting portion of the wing shaft and the cover member through which it projects, said end flange members and said cover members defining therebetween respective reservoir chambers, a passage extending through one of said abutments and both of said end flange members freely connecting said reservoir chambers, and a check valved replenishing passage through one of said end flange members connecting the reservoir chambers with the working chamber.

7. In a rotary hydraulic shock absorber construction, a generally ring-shaped body defining a cylindrical working chamber, a pair of end flange members respectively mounted in stacked relation on the opposite ends of said body, a respective generally cup-shaped cover member mounted in stacked relation on each of the end flange members, bolts extending through the stacked body and end flange and cover members and securing them rigidly together, an abutment secured in said chamber, a wing shaft mounted in coaxial relation within the chamber and having a vane thereon cooperating with the abutment to divide the working chamber into working compartments, valve controlled cross bores in the wing shaft connecting the compartments, valved one-way displacement passage means through the wing shaft connecting the compartments therethrough, opposite end portions of the wing shaft extending in journalled relation through said end flanges and cover members, said end flanges and cover members defining respective reservoir chambers, a passage through said abutment and both said end flanges freely connecting said reservoir chambers, and one of said end flanges having a check valved replenishment passage connecting one of the reservoir chambers with the working chamber.

8. A damper as defined in claim 7, in which attachment flange plate members are assembled with said cover members and secured by said bolts.

9. In a rotary hydraulic shock absorber construction, a tubular body defining a working chamber having abutment means therein, a wing shaft having vane means in said chamber, end flanges mounted on said body and closing the opposite ends of said working chamber, cover flanges mounted on said body in spaced relation to said end flanges defining respective reservoir chambers therewith, anti-friction bearing assemblies journalling the wing shaft on the body in said reservoir chambers, passage means completely bypassing said working chamber and connecting the reservoir chambers in free fluid transfer communication, and check valved replenishment passage means connecting the reservoir chambers with the working chamber.

10. A rotary hydraulic shock absorber comprising a tubular body defining a cylindrical working chamber having at least one abutment therein and a wing shaft relatively rotatably disposed coaxially through said chamber and having at least one vane cooperating with the wall defining said chamber and said abutment to subdivide the chamber into working compartments, said abutment and vane having a length equal to at least one half the bore diameter of the chamber, displacement passage means connecting the compartments and having flow restricting valve means therein, respective end flanges supported on said body and closing the opposite ends of said chamber, respective cover members cooperating with said end flanges to define respective reservoir chambers, means sealingly securing said cover members in place, at least one end portion of the wing shaft projecting as an attachment stem through one of said end flanges and its cooperating cover member, means affording a shaft seal between said wing shaft portion and the cover member through which it projects, passage means freely connecting said reservoirs, check valved replenishing communication passage means between at least one of said reservoirs and said chamber, said passage means connecting the reservoirs comprising a bore through said abutment and said end flanges, and roll pins extending into said passage means connecting the reservoirs to retain the end flanges against rotation relative to the abutment, 11. A rotary hydraulic shock absorber comprising a tubular body defining a cylindrical working chamber having at least one abutment therein and a wing shaft relatively rotatably disposed coaxially through said chamber and having at least one vane cooperating with the wall defining said chamber and said abutment to subdivide the chamber into working compartments, said abutment and vane having a length equal to at least one half the bore diameter of the chamber, displacement passage means connecting the compartments and having flow restricting valve means therein, respective end flanges supported on said body and closing the opposite ends of said chamber, respective cover members cooperating with said end flanges to define respective reservoir chambers, means sealingly securing said cover members in place, at least one end portion of the wing shaft projecting as an attachment stem through one of said end flanges and its cooperating cover member, means affording a shaft seal between said wing shaft portion and the cover member through which it projects, passage means freely connecting said reservoirs, and check valved replenishing communication passage means between at least one of said reservoirs and said chamber, said end flanges providing bearings for the wing shaft.

References Cited by the Examiner

UNITED STATES PATENTS

| 2,270,668 | 1/1942 | Davis | 188—93 |
| 2,997,140 | 8/1961 | Rumsey et al. | 188—93 |
| 3,038,646 | 6/1962 | Grimm | 188—93 X |
| 3,139,159 | 6/1964 | Lob | 267—64 X |

MILTON BUCHLER, *Primary Examiner.*

ARTHUR L. LA POINT, *Examiner.*